United States Patent [19]

Aoki

[11] Patent Number: 4,768,105

[45] Date of Patent: Aug. 30, 1988

[54] APPARATUS FOR EDITING A VIDEO SIGNAL

[75] Inventor: Shinji Aoki, Kanagawa, Japan

[73] Assignee: Sony Corporation, Tokyo, Japan

[21] Appl. No.: 871,293

[22] Filed: Jun. 6, 1986

[30] Foreign Application Priority Data

Jun. 10, 1985 [JP] Japan .................................. 60-125709

[51] Int. Cl.$^4$ ...................... H04N 5/782; G11B 27/02
[52] U.S. Cl. ....................................... 360/14.1; 360/70
[58] Field of Search .................... 360/14.1, 14.2, 14.3, 360/70

[56] References Cited

U.S. PATENT DOCUMENTS 3,742,132 6/1973 Sanguu ................................ 360/14.1
4,463,391 7/1984 Takano ................................ 360/14.2
4,510,535 4/1985 Tokumitsu ......................... 360/14.2

Primary Examiner—Alan Faber
Attorney, Agent, or Firm—Lewis H. Eslinger; Jay H. Maioli

[57] ABSTRACT

A video signal editing apparatus use in conjunction with an existing VTR having a helically scanning type rotary magnetic head. The apparatus is designed for recording a new video signal within the framework of the previously recorded video signals on the tape. The apparatus is so designed that an editing start point for starting the recording of the new video signals and an editing end point for terminating the recording of the new video signals are determined, and that the tape running and head rotation are controlled in accordance with servo errors at the editing start and end points during the time the new video signal is recorded on the tape.

3 Claims, 3 Drawing Sheets

APPARATUS FOR EDITING A VIDEO SIGNAL

BACKGROUND OF THE INVENTION

1. Field of the Invention

This invention relates to a video signal editing apparatus such as VTR and more particularly to a video signal editing apparatus capable for providing for insertion-edition such that new video signals can be recorded in a desired position on the magnetic recording medium on which other video signals are previously recorded.

2. Description of the Prior Art

In editing video signals on a video tape recorder (VTR), it becomes necessary to perform a so-called insertion-editing in which the pattern of the video and control signals previously recorded on the video tape or other recording medium, which is the so-called base pattern, is partially rewritten or replaced by new video signals. When performing the insertion-editing, the video signals on the tape start to be reproduced at a standard speed at a position tens or hundreds of frames ahead of the editing start point or so-called in-point and the servo data prevailing at the time immediately preceding the aforementioned in-point, such as, for example, tape skew or drum rotation phase data and, for performing dynamic tracking, head displacement data are stored. These servo data are utilized for controlling dynamic tracking servo, drum servo or capstan servo in the course of the insertion-editing for achieving coincidence of the tape skew and recording video phase between the base pattern and the newly insertion-edited pattern.

However, when performing the insertion-editing over a number of times on end, servo data discontinuities may be caused frequently at the point of returning to the base pattern, that is, ahead and back of the final editing end point or out-point, thus resulting in markedly disturbed playback image. In extreme cases, servo data discontinuities are so pronounced that it becomes impossible to perform servo control and hence the electronic editing operation can not be performed.

For example, when producing animation tapes, that is, tapes containing animation scenes, for example, it becomes necessary to perform a continuous editing consisting of a large number of individual editing operations in which a plurality of small shots each consisting of up to 20 frames are continuously insertion-recorded a number of times. At this time, since the in-point servo data for any arbitrary intermediate insertion-editing operation is obtained upon reproducing the immediately preceding insertion-edited pattern, servo data detection error and servo control error are accumulated with the increase in the number of times the editing is performed, with the result that servo data continuity is affected at the time of returning to the original base pattern at the out-point of the final insertion-editing thus causing so-called transients in the signal pattern. Therefore, at the time of the preview operation after the end of editing, reproduced images are disturbed in the vicinity of the editing end point or out-point so that it becomes necessary to again perform the editing operation. The result is the unavoidably lowered editing efficiency or image quality.

OBJECTS AND SUMMARY OF THE INVENTION

It is an object of the present invention to provide an apparatus for editing video signals that avoids the aforementioned problems.

It is another object of the present invention to provide a video signal editing apparatus in which the track pitch of the recorded video signals is not changed at editing points.

It is still another object of the present invention to provide a video signal editing apparatus in which new video signals are inserted within the predetermined duration of the prerecorded video signals and in which video signals substantially free of transient noise can be reproduced especially at an editing end point.

In accordance with an aspect of the present invention, there is provided a video signal editing apparatus having the function of insertion-edition and capable of recording video signals while the operating state is controlled in dependence upon the servo information or data, wherein the servo data immediately before the starting point of insertion-editing and the servo data immediately after the editing end point are detected in advance of the insertion-editing, and wherein the operational state is controlled during the insertion-editing in dependence upon servo data obtained by proportioning calculation which is performed on the basis of the servo data at the editing start point and the servo data at the editing end point.

DETAILED DESCRIPTION OF A PREFERRED EMBODIMENT

Figure 1:
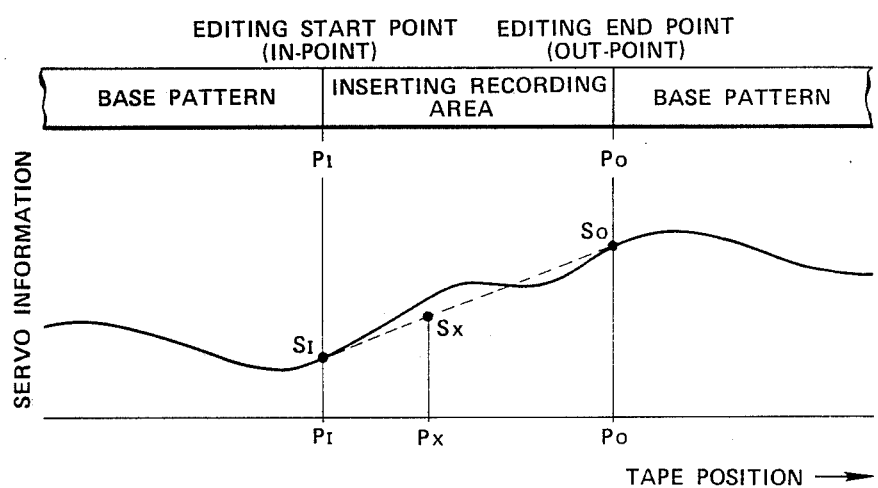
FIG. 1 is a schematic view of the video tape and the corresponding waveform of the servo information for explaining the operation of the apparatus according to the present invention.

Referring to FIG. 1, there are previously formed on a magnetic video signal recording medium such as video magnetic tape 1 video signals as well as various information signals as a so-called base pattern. It is assumed that an insertion-editing operation is to be performed on the tape 1 such that new video signals, for example, will be recorded in a tape section commencing from a position $P_I$ and terminating at a position Po when seen in the tape running direction. It is noted that the position $P_I$ represents a commencing point of insertion-edition or in-point whereas the position Po represents a terminating point of insertion-edition or out-point.

The recording of the inserting edition such as described above is usually preceded by what is called a rehearsal mode operation according to which standard speed reproduction is performed starting from a position which is tens or hundreds of frames ahead of the in-point $P_I$ and, as the in-point $P_I$ is reached, reproduction of the signals on the tape 1 is switched to that of the input video signals to be inserted, with reproduction of the input video signals being again switched to reproduction of the signals on the tape 1, at the out-point Po, the state of image junction being then examined. If there is no problem, one may proceed to recording of the aforementioned input video signals which is the actual insertion-editing operation. During the rehearsal operation, various servo control operations are carried out in the same manner as at the time of standard speed reproduction such that servo information or data such as tape skew control data or rotary head drum rotation phase data are obtained during tape running, as shown in FIG. 1. In this figure, $S_I$ and $S_O$ denote the values of the servo data at the in-point $P_I$ and at the out-going $P_O$, respectively.

In accordance with the video signal editing apparatus of the present invention, not only the servo data $S_I$ at the in-point $P_I$ but also the servo data $S_O$ at the out-point $P_O$ are detected before the actual insertion-editing or recording operation, for example, during the above described rehearsal operation, and stored in the memory means. During the actual insertion-editing or recording operation, servo control operation is performed on the basis of servo data as calculated by the proportioning operation between the servo data $S_I$ and $S_O$.

Thus the value $S_x$ at an arbitrary point $P_x$ between the in-point $P_I$ and the out-going $P_O$ along the tape running direction is found by a formula $$S_x = \frac{S_o - S_I}{P_o - P_I} \cdot P_x + \frac{S_I P_o - S_o P_I}{P_o - P_I} \quad (1)$$

such that the inserting recording operation is performed under the servo control based upon the thus-obtained servo data $S_x$. During the inserting recording operation, the servo data is indicated as shown by the dotted line in FIG. 1, from which it is seen that the servo data is changed smoothly linearly from the in-point $P_I$ to the out-point $P_O$.

In addition to the rotational phase control data for the capstan for controlling tape skew and the rotational phase control data for the rotary drum of the rotary head unit, the aforementioned servo data may include head height control data for a so-called dynamic tracking head in which tracking control is performed while dynamically controlling the height position of the rotary head, that is, the position across the track width of the rotary head. For each of these various servo data, the servo data $S_I$ and $S_O$ at the inpoint $P_I$ and the out-point $P_O$ are found and the servo data $S_x$ at an arbitrary position $P_x$ are caluculated by the above formula (1).

Figure 2:
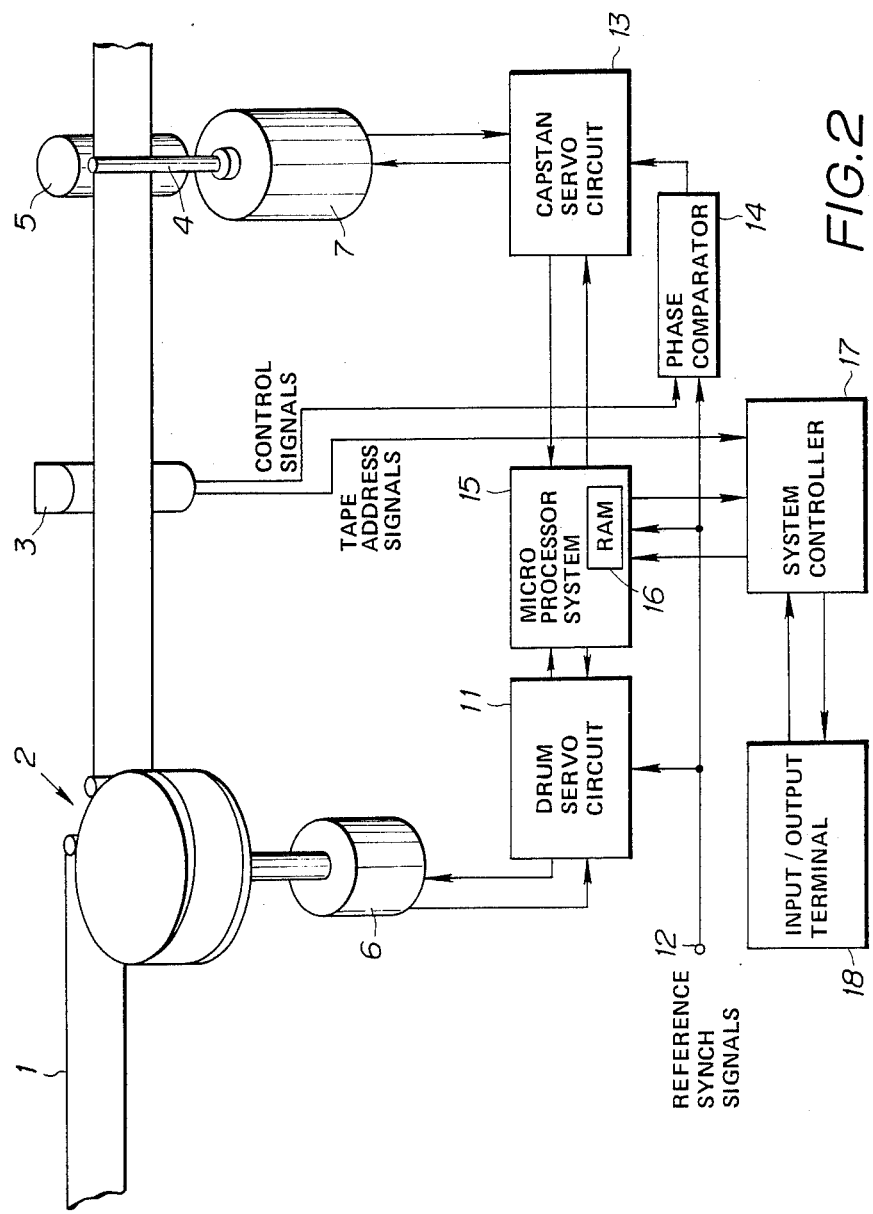
FIG. 2 is a circuit diagram of the apparatus according to a preferred embodiment of the present invention.

FIG. 2 shows essential parts of the video signal editing apparatus providing for the above operation, such as employed in a video tape recorder (VTR).

Referring to FIG. 2, a rotary head unit 2, a fixed head unit 3 and a tape driving capstan 4 associated with a pinch roller 5 are provided along the path of a magnetic recording medium such as video tape 1. The rotary head unit 2 is comprised of a drum on the periphery of which the tape 1 is wound and a rotating video head adapted for recording video signals on the tape 1. The video head is usually mounted on a rotary drum which is driven into rotation by a drum motor 6. The fixed head unit 3 is adapted for recording and reproducing audio signals and control signal (CTL). The fixed head unit 3 is also used for recording and reproducing address signals indicating tape running positions such as longitudinal time code signals (so-called LTC signals) by making use of part of the audio track on the tape 1. The capstan 4 is driven into rotation by a capstan motor 7 for driving the tape 1 while clamping the tape 1 between it and the pinch roller 5.

From the drum motor 6 of the rotary head unit 2, output signals indicating the sensed values of the rotational speed and phase of the rotary unnumbered drum are supplied to a drum servo circuit 11 where they are compared with the reference speed signals and reference synch signals for deriving motor drive control signals. These control signals are supplied to the drum motor for controlling the rotational speed and phase of the rotary head unit 2. The reference synch signals are supplied to the drum servo circuit 11 by way of input terminal 12. The output signals indicating the sensed value of the rotational speed from the capstan motor 7 are supplied to a capstan servo circuit 13 for comparison with the reference signals. The output signals indicating the sensed rotational speed from the capstan motor 7 are supplied to a phase comparator 15 for comparison with reference synch signals from the input terminal 12, the resulting capstan rotation phase error output being supplied to a capstan servo circuit 13. From the capstan servo circuit 13, signals for controlling the rotational speed and phase of the motor are supplied to the capstan motor 7.

It will be noted that the servo data from these servo circuits 11 and 13, such as, for examle, drum rotation phase data from the drum servo circuit 11 and capstan rotation speed data from the capstan servo circuit 13, are supplied to a microprocessor system 15. A random access memory (RAM) 16 is provided as memory means in the microprocessor system 15. In this RAM 16, not only the servo data $S_I$ at the in-point $P_I$ but also the servo data $S_O$ at the out-going $P_O$ are stored. In the course of the actual inserting recording or editing operation, operations are performed in the microprocessor system 15 on the basis of these servo data $S_I$ and $S_O$ for finding servo data $S_x$ at an arbitrary position $P_x$ between the in-point $P_I$ and an out-point $P_O$ by the proportionating calculation based on the above formula (1). The resulting servo data $S_x$ are supplied to the servo circuits 11 and 13.

To a system controller 17 adapted for controlling the overall operation of the apparatus is connected an input-/output terminal 18 provided with such functions as display and key input functions. From this terminal unit 18, general operational mode selection signals such as recording, reproducing, fast feed or rewind, in-point setting signals, out-point setting signals or editing mode selection signals are supplied to the system controller 17 while, from the system controller 17, response signals thereto and operational state display signals are supplied to the terminal unit 18. To the system controller 17 are also supplied tape address signals from the fixed head unit 3 and servo status signals from the controller 17, servo control signals are supplied to the microprocessor system 15.

Figure 3:
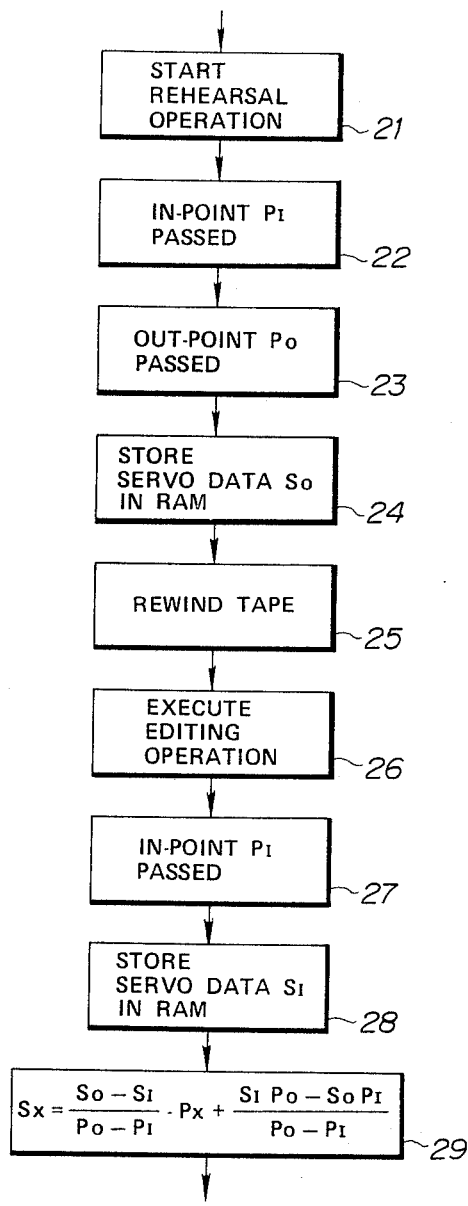
FIG. 3 is a flowchart showing the editing operation performed with the use of the apparatus shown in FIG. 2.

Referring now to the flowchart of FIG. 3, there is illustrated a typical programming operation in the microprocessor system 15. As the rehearsal operation is initiated at a step 21, reproduction is effected at a standard speed at a position on the tape which is tens to hundreds of frames ahead of the in-point $P_I$. With the lapse of time, passage through the in-point $P_I$ is detected at step 22. Then at step 23, passage through the in-point $P_I$ is detected. For detecting the passage of the running tape through the in-point $P_I$ and the out-going $P_O$, the tape address signals or so-called LTC signals are supplied from the fixed head unit 3 of FIG. 2 to the system controller 17 so as to be compared for possible coincidence with the previously set-in point $P_I$ and out-going Po at the system controller 17 or at the microprocessor system 15.

As the passage through the out-point Po is detected at step 23, the servo data So just after passage through the out-point Po is stored at step 24 in the RAM 16 of the microprocessor system 15.

As the rehearsal operation proceeds in the manner as described above, reproduction of the prerecorded signals on the tape is switched during the interval commencing at in-point $P_I$ and terminating at out-point Po to reproduction of new video signals so as to enable one to monitor the status of junction of reproduced images between the prerecorded signals and the new signals. If no problems are presented, one may proceed to actual insertion-editing operation, which is the recording of the new video signals.

Thus, after the tape has been rewound at step 25 to a position ahead of the in-going $P_I$, control shifts to step 26 to carry out the actual editing operation. At this time, the tape runs at the standard speed. Until the in-point $P_I$ is reached, the non-recording mode, such as reproduction mode, is selected. As the passage through the in-going $P_I$ is detected at step 27, the mode is switched to recording mode. At step 28, the prevailing servo data $S_I$ is stored in the RAM 16.

During the time the tape running position is anywhere between the in-point $P_I$ and the out-point Po, operation of the above formula (1) is performed at step 29 on the basis of the current tape position Px and the servo data $S_I$ and So stored in the RAM 16 in order to effect servo control of the current operating state on the basis of the thus-computed servo data Sx.

During the time the insertion-edition or recording is performed under the servo control as described hereinabove, the servo data are as indicated by the dotted line in FIG. 1 such that there results a smooth junction with the servo data So at the out-point Po that are obtained upon reproducing the original base pattern. Thus there is a smooth transition of the rotational phase of the drum or tape skew at the outpoint Po where the insertion edition is switched to the reproduction of the base pattern. The result is the improved continuity between the inserting recording pattern and the base pattern and markedly reduced disturbances in the reproduced image.

The present invention is not limited to the above described illustrative embodiment. For example, the rehearsal operation may be substituted by any equivalent operation. Thus, when the out-point deviation, that is, the deviation in the tape running position or address between the current editing operation and the next editing operation is not that high and less than about 20 frames, as is often encountered at the time of creation of animation tapes, it suffices that the servo data at the out-point Po for the next editing or recording be stored in a RAM at the time of exiting from or overrunning the current editing or recording operation. This exiting or overrunning operation represents an operation equivalent to the aforementioned rehearsal operation.

What is claimed is:

1. An apparatus for editing a video signal on a tape in which a new video signal is recorded within an existing video signal previously recorded on the tape, comprising:
   means for controlling the running of the tape and the rotation of a magnetic head adapted for recording or reproducing the video signal on or from said tape;
   means for determining an editing start point on said tape at which recording of the new video signal is to be commenced and an editing end point on said tape at which recording of the new video signal is to be terminated;
   means for detecting servo data from said controlling means at said editing start point and end point, respectively;
   means for deriving editing servo data for an arbitrary point between said editing start point and end point from said servo data detected at said editing start point and said end point; and
   means for driving said controlling means in accordance with said derived editing servo data during the time said new video signal is recorded on the tape.

2. An apparatus according to claim 1, wherein said means for deriving includes memory means for storing said servo data detected at said editing start point and end point.

3. An apparatus according to claim 1, wherein said means for deriving derives said editing servo data in accordance with:

$$S_X = [(S_O - S_I)/(P_O - P_I)]P_X + (S_I P_O - S_O P_I)/(P_O - P_I)$$

where $S_X$ is the editing servo data, $P_I$ the editing start point, $P_O$ the editing end point, $P_X$ the arbitrary point, $S_I$ the servo data at the editing start point, and $S_O$ the servo data at the editing end point.

* * * * *